United States Patent
Sarett et al.

[15] 3,692,821

[45] Sept. 19, 1972

[54] DERIVATIVES OF 2-ALKANOYLOXY AND 2-HYDROXY-3-PHENYLBENZOIC ACID

[72] Inventors: Lewis H. Sarett, Rolling Hill Road, Skillman, N.J. 08558; William V. Ruyle, 1481 Rahway Road, Scotch Plains, N.J. 07076

[22] Filed: Sept. 9, 1970

[21] Appl. No.: 70,893

Related U.S. Application Data

[63] Continuation-in-part of Ser. No. 674,702, June 10, 1967, abandoned.

[52] U.S. Cl.....260/473 R, 260/268 TR, 260/293.73, 260/293.78, 260/293.81, 260/293.83, 260/465 D, 260/470, 260/471 R, 260/473 S, 260/476 R, 260/479 R, 260/516, 260/520, 424/250, 424/267, 424/304
[51] Int. Cl..............................................C07c 65/14
[58] Field of Search........260/473 R, 473 S, 520, 479

[56] References Cited

UNITED STATES PATENTS

| | | | |
|---|---|---|---|
| 3,249,637 | 5/1966 | Early et al. | 260/559 |
| 3,317,382 | 5/1967 | Brunner | 260/520 R X |
| 3,123,531 | 3/1964 | Sahyun | 424/358 |

*Primary Examiner*—Lorraine A. Weinberger
*Assistant Examiner*—John F. Terapane
*Attorney*—Michael C. Sudol, Jr., Harry E. Westlake, Jr. and I. Louis Wolk

[57] ABSTRACT

New phenyl benzoic acid and ester compounds particularly substituted 5-(substituted phenyl)benzoic acid and ester derivatives and processes for their preparation are claimed. The new phenyl benzoic acid and ester compounds described have anti-inflammatory, anti-pyretic and analgesic activity.

3 Claims, No Drawings

DERIVATIVES OF 2-ALKANOYLOXY AND 2-HYDROXY-3-PHENYLBENZOIC ACID

CROSS REFERENCES TO RELATED APPLICATIONS

This application is a continuation-in-part of U.S. Ser. No. 674,702 filed in the U.S. Patent Office on June 10, 1967, now abandoned.

BACKGROUND OF THE INVENTION

The development of anti-inflammatory compounds in the past two decades has seen the growth of a great many new drugs. Most of these have been steroids of the 11-oxygenated pregnane series. These, while highly effective, have the drawback of causing many side effects. There is a need in the market for equally effective compounds of much simpler structure and having less side effects.

SUMMARY OF THE INVENTION

This invention relates to new phenyl benzoic acid and ester compounds and processes for producing the same, particularly novel substituted 5-(substituted phenyl) benzoic acid or ester derivatives. These compounds are useful in that they have anti-inflammatory activity and are effective in the prevention and inhibition of edema and granuloma tissue formation. In addition, some of them have a useful degree of anti-pyretic and analgesic activity.

DESCRIPTION AND PREFERRED EMBODIMENTS

This invention relates to new phenyl benzoic acid or ester compounds and to processes for producing same. More specifically, the invention relates to substituted 5-(substituted phenyl) benzoic acid or ester derivatives. Still more specifically, this invention relates to compounds having the following general formula:

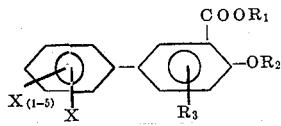

wherein
X is hydrogen or halogen (such as chloro, bromo, fluoro or iodo, preferably fluoro);
R is alkyl (preferably lower alkyl such as methyl, ethyl, propyl, isopropyl, butyl, pentyl), alkoxy (preferably lower alkoxy, such as methoxy, ethoxy, isopropoxy, or butoxy);
R being the above two radicals, namely, alkyl or alkoxy only when X and $R_3$ are both hydrogen;
hydrogen, nitro, halo alkyl (preferably halo lower alkyl, such as chloromethyl, bromomethyl, trifluoromethyl), amino, dialkylamino (preferably diloweralkylamino, such as dimethylamino, diethylamine, dipropylamino or dibutylamino), acyl amino (such as acetamido, propionamido, formamido or butyramido), lower acyl (such as formyl, acetyl, propionyl, butyryl, etc.), hydroxy, acyloxy (such as formyloxy, acetoxy, propionoxy, etc.), sulfonyl or sulfonamido;
$R_1$ is hydrogen or lower alkyl (such as, methyl, ethyl, propyl, butyl or pentyl),
$R_2$ is hydrogen, lower acyl (such as formyl, acetyl, propionyl or butyryl), or lower alkyl (such as methyl, ethyl, propyl, butyl or pentyl),
$R_3$ is hydrogen, halo alkyl (preferably halo lower alkyl, such as chloromethyl, bromomethyl, trifluoromethyl, etc.), nitro, amino, dialkylamino (preferably diloweralkylamino, such as diethylamino, dimethylamino, dipropylamino, dibutylamino), lower acyl (such as, formyl, acetyl, propionyl or butyryl), dialkylamino alkyl (preferably diloweralkylamino lower alkyl such as diemthylamino ethyl), heterocyclic lower alkyl (such as β-N-piperidino ethyl, N-piperazino methyl; 1-(4-phenyl piperazino) methyl); amino alkyl (preferably aminoloweralkyl, such as β-aminoethyl and aminomethyl), cyano, sulfonyl, sulfonamido, hydroxy, acyloxy (such as benzoyloxy, acetoxy or propionoxy), thio, alkylthio (preferably loweralkylthio, such as ethylthio, methylthio or isopropylthio).

The preferred compounds of this invention are those shown above wherein
X is hydrogen or halogen (preferably fluoro) and is on the 4'-position of the benzenoid ring, but especially wherein X is hydrogen,
R is hydrogen or lower alkoxy, but especially lower alkoxy,
$R_1$ is hydrogen or lower alkyl,
$R_2$ is hydrogen or lower acyl and
$R_3$ is hydrogen,
  halo lower alkyl,
  nitro,
  amino or
  acyl.

Representative compounds of this invention are as follows:
2-hydroxy-5-(ortho tolyl)-benzoic acid
2-hydroxy-5-(4'-methoxyphenyl)-benzoic acid
2-hydroxy-3-nitro-5-(4'-fluorophenyl)-benzoic acid
3-acetyl-2-hydroxy-5-(4'-fluorophenyl)-benzoic acid
3-amino-2-hydroxy-5-(4'-fluorophenyl)-benzoic acid
methyl-2-acetoxy-3-bromomethyl-5-(4'-fluorophenyl)-benzoate
methyl-2-hydroxy-3-(N-piperazinylmethyl)-5-(4'-fluorophenyl)-benzoate.

We have found that the compounds described above have anti-inflammatory activity and are effective in the prevention and inhibition of edema and granuloma tissue formation. In addition, some of them have a useful degree of anti-pyretic and analgesic activity. For these purposes they are normally administered orally in tablets or capsules, the optimum dosage depending on the particular compound being used and the type and severity of the condition being treated. Although the optimum quantities to be used will depend on the compound employed and the particular type of disease treated, oral dose levels of preferred compounds in the range of 50 mg. to 10 g. per day are useful in the control of said conditions, depending on the activity of the specific compound and the reaction sensitivity of the patient.

The end products of the instant case, particularly those of Formula 1 wherein $R_3$ is hydrogen can be prepared by carboxylating the appropriate 4-(substituted phenyl) phenol. This can be accomplished by heating the appropriately substituted phenol under pressure with carbon dioxide gas. The product can then be isolated from the reaction mixture by methods known in the art. The temperature at which the carboxylation reaction can take place is from 50° to 300° C. The reaction can also take place at from atmospheric pressure to higher pressures, preferably however at 200° C. and at 800 p.s.i. pressure.

In order to prepare those compounds of Formula 1 which have an $R_3$ group thereon, 5-(4'-fluorophenyl)-salicylic acid can be reacted with the appropriate substituent to place and $R_3$ group on the molecule. Thus, in order to form a compound of Formula 1 wherein $R_3$ is nitro, the appropriately substituted salicylic acid is reacted with concentrated nitric acid in the presence of glacial acetic acid. The reaction is heated on a steam bath for a sufficient time to complete the reaction. After treating the reaction mixture with ice and water, the product can then be extracted with an organic solvent and isolated therefrom. The nitro group, of course, can be converted to the amino group by reduction, by reacting said nitro compound with hydrogen in the presence of a hydrogenation catalyst such as palladium-on-carbon under pressures from about atmospheric pressure to 100 p.s.i. The amino compound can be isolated as the hydrochloride salt by evaporation of the reaction solvent (preferably a lower alkanol) and addition of an ethereal solution of dry hydrogen chloride gas.

Various of the groups on the 3-position ($R_3$) of the compound of Formula 1 can be prepared by reacting the 5-(substituted phenyl) salicylic acid or the 2-o-acyl derivative thereof with the appropriately substituted $R_3$ reagent.

Similarly, desired end products having various $R_3$ substituents thereon can be prepared using suitable reactions in order to convert one $R_3$ group to another. Various types of these reactions are shown in the examples.

The following are a group of detailed examples which show the preparation of the desired compounds of this invention. They are to be construed as illustrations of the invention and not as limitations thereof.

EXAMPLE 1

2-Hydroxy-5-(ortho tolyl)-benzoic acid

A mixture of 900 mg. of 4-(ortho tolyl)-phenol and 4 g. of anhydrous potassium carbonate is heated at 200° C. under 800 p.s.i. initial pressure of carbon dioxide for 4 hours. The reaction mixture is taken up in warm water, acidified with hydrochloric acid, and the product extracted into ethyl acetate. After drying the ethyl acetate solution with sodium sulfate, and removal of the solvent, the product is recrystallized from chloroform/hexane to furnish pure 2-hydroxy-5-(ortho tolyl)-benzoic acid, m.p. 150°–152° C.

The preparation of the starting material, namely 4-(ortho tolyl) phenol is shown in Kliegl and Huber, Ber 53 1652 (1920).

EXAMPLE 2

2-Hydroxy-5-(4'-methoxyphenyl)-benzoic acid

A mixture of 2.8 g. of 4-(para-methoxyphenyl)-phenol and 11 g. of anhydrous potassium carbonate is heated at 200° C. for 4 hours under an initial pressure of 800 p.s.i. of carbon dioxide gas. The reaction mixture is worked up in a manner similar to that described in Example 1. After recrystallization from ethyl acetate/hexane, the pure 2-hydroxy-5-(4'-methoxyphenyl)-benzoic acid had a melting point of 222°–225° C.

The preparation of the starting material, namely, 4-(para-methoxyphenyl)-phenol is shown in J. Van Alphen, Chem. Zentr. 1931 II 847.

EXAMPLE 3

2-Hydroxy-3-nitro-5-(4'-fluorophenyl)-benzoic acid

A solution of 5 g. of 2-hydroxy-5-(4'-fluorophenyl)-benzoic acid in 35 ml. of glacial acetic acid is stirred while heating on a steam bath, and 1.3 g. of concentrated nitric acid is added dropwise. After heating on the steam bath for an additional hour, the reaction mixture is poured into an ice-water mixture, and the product is extracted into chloroform. After drying the chloroform solution and removal of solvent, the crude product is recrystallized from benzene/hexane mixture to obtain pure 2-hydroxy-3-nitro-5-(4'-fluorophenyl)-benzoic acid.

The 2-hydroxy-5-(4'-fluorophenyl)-benzoic acid is prepared as follows:

A solution of 32.66 grams of 4-(4'-fluorophenyl)-aniline in 120 ml. of glacial acetic acid is cooled to 10°–12 C. To this solution is added slowly a solution of 12.25 grams of sodium nitrite in 120 ml. of water with stirring and continued cooling. Five minutes after this addition, the suspension of the diazonium acetate is added slowly to a boiling solution of 100 ml. of concentrated sulfuric acid and 200 ml. of water. After the final addition of the diazonium salt, the suspension is boiled for an additional 5 minutes and then allowed to cool to room temperature. The reaction mixture is then filtered and the cake dried in vacuo to yield 4-(4'-fluorophenyl)-phenol (m.p. 152°–161° C., 24.07 grams).

A mixture of 10 grams of 4-(4'-fluorophenyl)-phenol and 27.2 grams of potassium carbonate is exposed to carbon dioxide at 1,300 p.s.i. and 175° C. The dark mass obtained from this carbonation is then dissolved in 300 ml. of water and 200 ml. of methylene chloride and the two layers separated. The water layer is then extracted with 100 ml. of methylene chloride and then acidified with 2.5N hydrochloric acid. This mixture is then filtered and the cake dried in vacuo to yield 5.32 grams of the crude product. The crude product is then recrystallized from benzene/methanol to yield 2.7 grams of material (m.p. 200°–204° C.). An additional crystallization of this semipure material from benzene/methanol yields analytically pure 2-hydroxy-5-(4'-fluorophenyl)-benzoic acid (m.p. 199°–203° C.

EXAMPLE 4

3-Acetyl-2-hydroxy-5-(4'-fluorophenyl)-benzoic acid

To a well-stirred solution of 5 g. of 2-acetoxy-5-(4'-fluorophenyl)-benzoic acid in 21 ml. of nitrobenzene at 60° C. is added 5.0 g. of anhydrous aluminum chloride in small portions. The reaction mixture is stirred for 6 hours at 60° C., and is poured into a mixture of 25 ml.

of concentrated hydrochloric acid and 50 g. of ice. The mixture is extracted with 200 ml. of ethyl acetate, and the ethyl acetate solution is extracted with 2.5 N sodium hydroxide solution. Upon acidification of the alkaline extract, the crude product precipitates and is collected, dried, and recrystallized from benzene/hexane mixture to obtain pure 3-acetyl-2-hydroxy-5-(4'-fluorophenyl)-benzoic acid.

The starting material, namely 2-acetoxy-5-(4'-fluorophenyl)-benzoic acid is prepared as follows:

A solution of 3.0 grams of 2-hydroxy-5-(4'-fluorophenyl)-benzoic acid (see preparation of starting material in Example 3) in 12 ml. of pyridine and 8 ml. of acetic anhydride is heated on a steam bath for 20 minutes. The mixture is then poured onto ice and the product extracted with methylene chloride. The methylene chloride solution is dried and then evaporated. The residue is recrystallized from benzene to yield 2-acetoxy-5-(4'-fluorophenyl)-benzoic acid (m.p. 134°–137° C.).

EXAMPLE 5

3-Amino-2-hydroxy-5-(4'-fluorophenyl)-benzoic acid

A solution of 5 g. of 2-hydroxy-3-nitro-5-(4'-fluorophenyl)-benzoic acid (see preparation of starting material in Example 3) in 75 ml. of methanol is hydrogenated at 40 p.s.i. in the presence of 0.5 g. of 10 percent palladium-on-carbon catalyst. After removal of the catalyst by filtration and evaporation of most of the solvent, the solution is treated with an excess of an ethereal solution of dry hydrogen chloride to cause the precipitation of the hydrochloride of 3-amino-2-hydroxy-5-(4'-fluorophenyl)-benzoic acid. This product is filtered, washed with acetone and dried.

EXAMPLE 6

Methyl-2-acetoxy-3-bromomethyl-5-(4'-fluorophenyl)-benzoate

To a solution of 5 g. of methyl-2-acetoxy-3-methyl-5-(4'-fluorophenyl)-benzoate in 75 ml. of carbon tetrachloride is added 50 mg. of benzoyl peroxide and 3.2 g. of N-bromosuccinimide. The mixture is illuminated with a U.V. lamp and heated at reflux until the N-bromosuccinimide is consumed. The succinimide is filtered off, the solvent is removed by evaporation, and the residue is subjected to chromatography on silica gel. Elution with mixtures of ether and petroleum ether furnishes pure methyl-2-acetoxy-3-bromomethyl-5-(4'-fluorophenyl)-benzoate.

The starting material described above, namely methyl-2-acetoxy-3-methyl-5-(4'-fluorophenyl)-benzoate is obtained as follows:

A mixture of 1.5 g. of 4-(4'-fluorophenyl)-2-methylphenol and 6 g. of anhydrous potassium carbonate is heated in a bomb at 175° C. and 850 p.s.i. carbon dioxide pressure for 16 hours. The reaction mixture is suspended in hot water, acidified, and the cooled mixture extracted with ethyl acetate. The ethyl acetate was extracted repeatedly with portions of 1 percent solution of sodium bicarbonate. The pooled bicarbonate extracts are acidified, and the product extracted into ether. After treatment with magnesium sulfate and activated charcoal, the ether solution was concentrated to a small volume. The addition of hexane causes the crystallization of 0.71 g. of 5-(4'-fluorophenyl)-2-hydroxy-3-methyl-benzoic acid, m.p. 211°–213° C. (sublimes).

A solution of 5.0 grams of 5-(4'-fluorophenyl)-2-hydroxy-3-methyl-benzoic acid in 20 ml. of methanol and 2 ml. of concentrated sulfuric acid is heated at reflux for 5 hours. The mixture is then cooled and partitioned between (75:150 ml.) water and ethyl acetate and the organic layer washed with dilute sodium bicarbonate solution. The organic layer is then dried over magnesium sulfate and concentrated in vacuo to yield 5.3 grams (as an oil) of methyl-5-(4'-fluorophenyl)-2-hydroxy-3-methylbenzoate.

A solution of 3.0 grams of methyl-5-(4'-fluorophenyl)-2-hydroxy-3-methyl-benzoate in 12 ml. of pyridine and 8 ml. of acetic anhydride is heated on a steam bath for 20 minutes. The mixture is then poured onto ice and the product extracted with methylene chloride. The methylene chloride solution is dried and then evaporated. The residue is recrystallized from benzene to yield methyl-2-acetoxy-3-methyl-5-(4'-fluorophenyl)-benzoate.

EXAMPLE 7

Methyl-2-hydroxy-3-(N-piperazinylmethyl)-5-(4'-fluorophenyl)-benzoate

A solution of 0.1 mole of methyl-2-acetoxy-3-bromomethyl-5-(4'-fluorophenyl)-benzoate (obtained as in Example 6) in 100 ml. of methanol is added to a solution of 0.2 moles of piperazine and 0.2 equivalents of hydrogen chloride in 200 ml. of methanol. After heating at 70° C. for 1.5 hr. the mixture is cooled and the piperazine dihydrochloride is filtered off. The filtrate is treated with additional anhydrous hydrogen chloride, and warmed until the o-acetyl group is removed, as judged by infrared analysis of an aliquot of the mixture. Most of the solvent is removed in vacuo, and the remaining solution is diluted with ether and washed with sodium bicarbonate solution. The ethereal solution is dried with magnesium sulfate, and treated with anhydrous hydrogen chloride to obtain the bis-hydrochloride of methyl-2-hydroxy-3-(N-piperazinyl methyl)-5-(4'-fluorophenyl)-benzoate.

What is claimed is:

1. A compound of the formula:

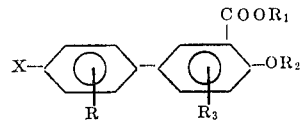

wherein:
X is halogen or hydrogen;
R is lower alkoxy,
$R_1$ is hydrogen or lower alkyl;
$R_2$ is hydrogen or lower alkanoyl; and
$R_3$ is hydrogen;
  halo-lower alkyl; or
  lower alkanoyl.

2. A compound of the formula:

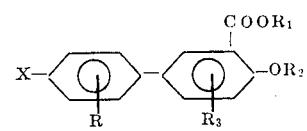

wherein:
X is hydrogen;
R is lower alkoxy;
$R_1$ is hydrogen or lower alkyl;
$R_2$ is hydrogen or lower alkanoyl; and
$R_3$ is hydrogen;
   halo lower alkyl; or
lower alkanoyl.

3. A compound of claim 2 which is 2-hydroxy-5-(4'-methoxyphenyl)-benzoic acid.

4. The compound methyl-2-acetoxy-3-bromomethyl-5-(4'-fluorophenyl)-benzoate.

* * * * *